(12) United States Patent
Johri et al.

(10) Patent No.: US 11,188,258 B2
(45) Date of Patent: Nov. 30, 2021

(54) DISTRIBUTED STORAGE SYSTEM

(71) Applicant: Hitachi, Ltd., Tokyo (JP)

(72) Inventors: Abhishek Johri, Tokyo (JP); Mitsuo Hayasaka, Tokyo (JP); Hieuhanh Le, Tokyo (JP)

(73) Assignee: HITACHI, LTD., Tokyo (JP)

( * ) Notice: Subject to any disclaimer, the term of this patent is extended or adjusted under 35 U.S.C. 154(b) by 182 days.

(21) Appl. No.: 16/325,280

(22) PCT Filed: Jun. 19, 2017

(86) PCT No.: PCT/JP2017/022553
§ 371 (c)(1),
(2) Date: Feb. 13, 2019

(87) PCT Pub. No.: WO2018/235132
PCT Pub. Date: Dec. 27, 2018

(65) Prior Publication Data
US 2020/0401340 A1    Dec. 24, 2020

(51) Int. Cl.
*G06F 3/06*        (2006.01)
(52) U.S. Cl.
CPC .......... *G06F 3/0659* (2013.01); *G06F 3/0604* (2013.01); *G06F 3/067* (2013.01); *G06F 3/0631* (2013.01)

(58) Field of Classification Search
CPC .... G06F 3/0659; G06F 3/0604; G06F 3/0631; G06F 3/067; G06F 12/00; G06F 13/00
See application file for complete search history.

(56) References Cited

U.S. PATENT DOCUMENTS

| | | | |
|---|---|---|---|
| 10,620,830 B2* | 4/2020 | Donlan | G06F 11/1448 |
| 2014/0019683 A1* | 1/2014 | Ishikawa | G06F 3/061 |
| | | | 711/114 |
| 2014/0195847 A1 | 7/2014 | Webman et al. | |
| 2014/0229879 A1* | 8/2014 | Lee | G06F 3/04842 |
| | | | 715/771 |
| 2014/0289562 A1 | 9/2014 | Ozawa | |

OTHER PUBLICATIONS

International Search Report of PCT/JP2017/022553 dated Sep. 12, 2017.

* cited by examiner

*Primary Examiner* — Tuan V Thai
(74) *Attorney, Agent, or Firm* — Mattingly & Malur, PC

(57) ABSTRACT

A distributed storage system includes a first node group consisting of a plurality of nodes and a second node group consisting of a plurality of nodes. Each of the first node group and the second node group distributes and stores data of an assigned object to a plurality of constituent nodes. The first node group includes at least one first node shared with the second node group and at least one second node not shared with the second node group. The second node group includes the at least one first node and at least one third node not shared with the first node group.

15 Claims, 10 Drawing Sheets

NODE GROUP MANAGEMENT TABLE

| NODE GROUP ID | MEMBER NODE ID LIST | OVERLAPPING NODE GROUP ID |
|---|---|---|
| 20A | 100A, 100B, 100C, 100D | 20B |
| 20B | 100C, 100D, 100E, 100F | 20A |
| ... | ... | ... |
| | | |
| | | |

[Fig. 10]

OBJECT ASSIGNMENT TABLE

DISTRIBUTED STORAGE SYSTEM

TECHNICAL FIELD

The present invention is related to reading and writing data in a distributed computer system.

BACKGROUND ART

With the sharp increase in digital data handled by IT (Information Technology) systems, special data storage systems are required which can store and process huge amount of data at high speeds. With this background, in recent years, multiple data storage systems and/or servers are connected together using a network, and collectively presented to clients as a huge storage pool. In this scale-out distributed system cluster, multiple computer systems (hereinafter node) could be connected together through a data network. These multiple computer systems can virtually present themselves as a huge singular computer system. A client can read/write data from/to any of these nodes. Data written to this scale-out cluster gets distributed across the cluster and gets written to multiple nodes, so that IO on huge amount of data can be handled in parallel, giving a broader IO bandwidth.

In order to reduce the possibility of data loss and to reduce the impact of simultaneous multiple nodes failure, a method of node grouping is disclosed in US 2014/0195847 A, for example. Few nodes of a cluster are logically grouped together to make a node group (also referred to as failure domain). Each node is exclusively assigned to one node group only. A cluster consists of node groups. Object data which makes up a complete set (such as a file, a directory and a volume) is distributed to nodes of one node group only. Data redundancy methods such as RAID are often used within node groups to reduce the risk of data loss due to a node failure.

SUMMARY OF INVENTION

Small start use cases are very common in actual business situations. In a small start case, a business unit initially constructs a small cluster with a few nodes, and when the business grows up and more resources are required, the business unit gradually adds more nodes with time one by one in the cluster.

When there is a small number of nodes, data distribution to all the nodes gives better performance. Thus, multiple node groups are not made initially in a small start case. However, as more nodes are added and the cluster grows up, a user may want to implement node groups. However, since data of an object is limited to one node group, multiple nodes must be added together for data redundancy to start a new node group.

For example, because of financial limitations, a user may not be able to add multiple nodes in the cluster simultaneously. Another option could be to keep expanding the cluster till the cluster reaches the size of two node groups, and then break it into two node groups.

However, this method causes movement of huge amount of data within the nodes at the time of making new node groups. This is because object data that is randomly distributed in different nodes of the cluster must be limited within the nodes of one node group.

Further, until making new node groups, the size of the original cluster or node group grows to twice the ideal size of a node group. This increases the risk of multiple nodes failure within the cluster or the big node group, which may cause permanent data loss.

An aspect of the present invention is a distributed storage system including a first node group consisting of a plurality of nodes and a second node group consisting of a plurality of nodes. Each of the first node group and the second node group distributes and stores data of an assigned object to a plurality of constituent nodes. The first node group includes at least one first node shared with the second node group and at least one second node not shared with the second node group. The second node group includes at least the one first node and at least one third node not shared with the first node group.

An aspect of the present invention allows reconfiguring node groups appropriately with an increase of nodes of a distributed storage system.

DESCRIPTION OF EMBODIMENTS

Embodiments are described below with reference to the accompanying drawings. The embodiments to be described below, however shall not limit the present invention according to the claims. All combinations of features described in the embodiments are not always essential as means of the solutions stated in the present invention.

An embodiment relating to a method for scale out of data storage system is disclosed. An example of a distributed data storage system includes multiple computer systems (nodes). A node runs a sliding window process which gradually separates two node groups as more new nodes are added in the distributed storage system. At first, when the number of nodes in the distributed storage system is less than a predetermined optimal size of node group, the node group keeps on expanding when more nodes are added in the cluster.

On the other hand, when a new node is added to the cluster where the existing node group size is already the optimal size of node group, a new node group is created which initially overlaps the existing node group, and then logically slides to the new node group to include the newly added node and excluding one of the old nodes.

Some of the nodes are shared between two node groups, while some nodes remain exclusively assigned to one node group. As more nodes are gradually added to the distributed storage system, the two node groups gradually become more separate (share less nodes), and finally become completely separate.

This method allows adding a new node to a distributed storage system, while maintaining the advantages of node group. This method also allows making a new node group (failure domain) without causing huge data movement among nodes of the cluster.

Embodiments of the present invention are described below with reference to the accompanying drawings. The embodiments to be described below, however, shall not limit the present invention according to the claims. All combinations of features described in the embodiments are not always essential as means of the solutions stated in the present invention.

Figure 1:
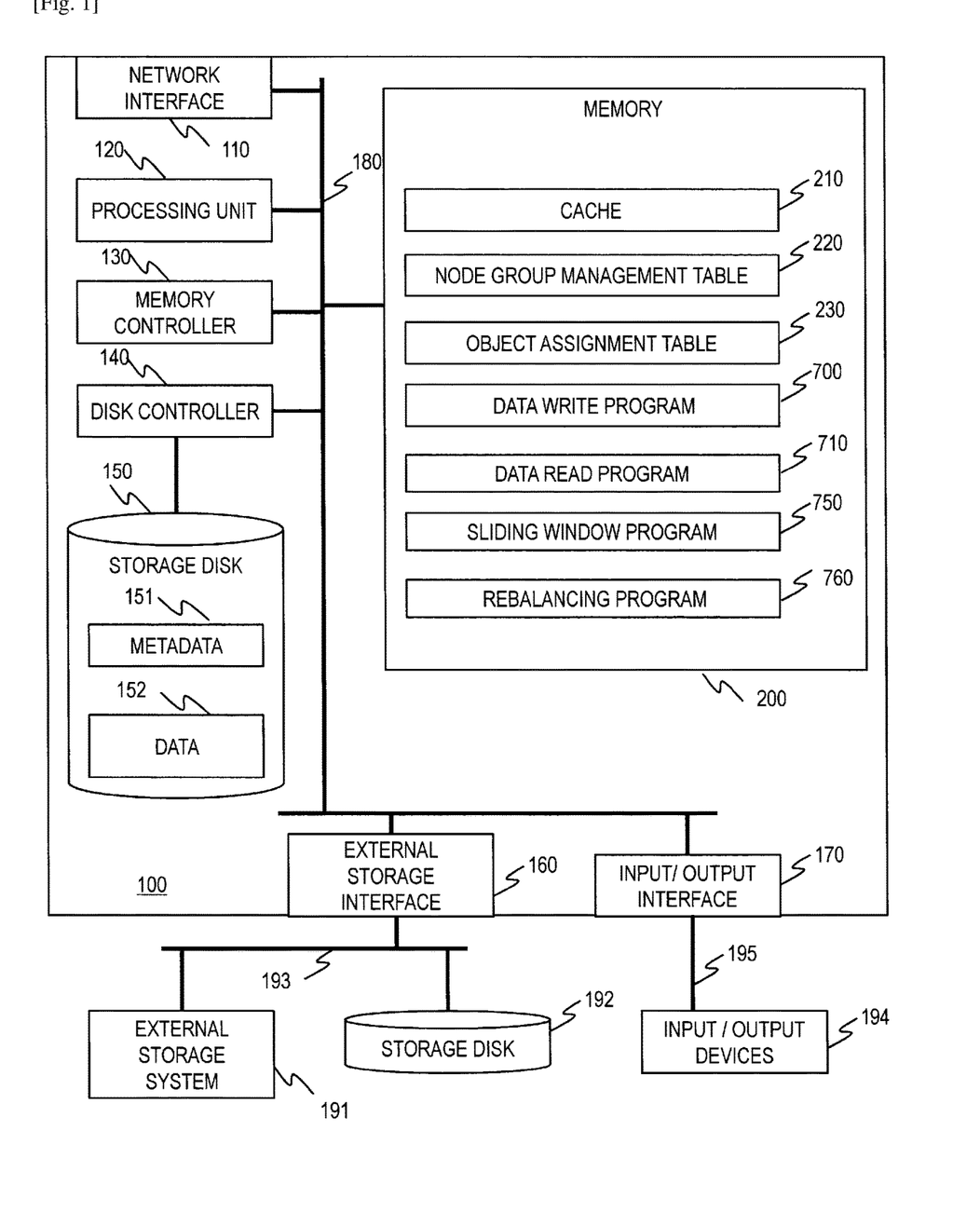
FIG. 1 is a block diagram of the hardware configuration of a computer system according to an embodiment.

FIG. 1 is a block diagram of the hardware configuration of a computer system 100 according to an embodiment. The computer system 100 includes a network interface 110, a processing unit 120, a memory controller 130, a disk controller 140, a storage disk 150, an external storage interface 160, an input/output interface 170, an internal network bus 180, and a memory 200.

The computer system 100 may include a plurality of items of each kind of the above mentioned components 110, 120, 130, 140, 150, 160, 170, 180, and 200; however, for the sake of simplicity only, one item of each component is shown in FIG. 1.

The network interface 110 is an interface to connect the computer system 100 through a network to other computers. The network interface 110 and the network allow the computer system 100 to communicate with other computers to transmit/receive data and commands. Any type of network which can perform data communication may be used, such as SAN (Storage Area Network), LAN (Local Area Network), Internet, leased line, and public line.

The processing unit (processor) 120 may include one or more general purpose processor chips of one or more cores. The processing unit 120 may also include a GPU or an ASIC in order to perform some specific tasks more efficiently and quickly. The processing unit 120 may also include local memory in order to be able access some information quickly. There may be a plurality of processing units 120 in the computer system 100.

The memory controller 130 is used by the processing unit 120 for writing/reading data to/from the memory 200. The disk controller 140 is used by the processing unit 120 for writing/reading data to/from the storage disk 150.

The storage disk 150 is a secondary data storage device such as a HDD or a SSD. There can be a plurality of the storage disks 150 in the computer system 100. The storage disk 150 stores user data, an operating system, application programs, application data, disk management metadata, and other relevant data used for operation of the computer system 100. For example, the storage disk 150 may be a logical device configured using multiple physical storage disks, and also have RAID data protection.

The external storage interface 160 is used to perform data transfer between the computer system 100 and one or more external storage media, such as an external storage system 191 and an external storage disk 192. The external storage disk 192 may be similar to the storage disk 150 explained above.

The input/output interface 170 is an interface used for communication between computer system 100 and data input/output devices 194. The data input devices 194 may be a keyboard and a computer mouse, for example. The data output devices may be a display monitor and a printer, for example. The internal network bus 180 connects the components of the computer system 100 with each other according to communication requirements.

The memory 200 is low latency primary storage such as DRAM. The memory 200 may consist of one or more parts of primary storage. The memory 200 may have a cache memory (region) 210 to temporarily store data that is under processing, or data that may be used for future reference.

The cache memory 210 may also temporarily store metadata related to data block management, and other relevant information that may be required by the operating system or application programs for their operation. The memory 200 may also store control information for communicating between multiple processing units 120.

The control information may contain configuration data related to the configuration of the computer system 100. In this embodiment, the memory 200 also stores control information such as a node group management table 220 and an object assignment table 230. The details of the tables 220 and 230 will be described later.

A part of the memory 200 is used as a program memory to store programs to be executed by the processing unit 120. Specifically, the memory 200 stores a data write program 700, a data read program 710, a sliding window program 750, and a rebalancing program 760.

The processing unit 120 unit operates based on the programs (processes) in the memory 200, thereby operating as functional parts for realizing predetermined functions. For example, the processing unit 120 functions, while operating based on the sliding window program 750, as a sliding window part, and functions, while operating based on the rebalancing program 760, as a rebalancing part. An apparatus and a system containing a processor are an apparatus and a system containing those functional parts.

The computer system 100 may be a general purpose computer, or it may be a computer system for a specific purpose. For example, in other embodiments of the present invention, the computer system 100 may be a block data storage system, a file data storage system, an object storage system, or a unified storage system.

In each embodiment, the computer system may have additional components specific to the embodiment and well known to a person skilled in the art. The structure of the computer system 100 for the specific purpose may be modified by a person skilled in the art, while keeping the essence of the present invention. Hereinafter, the computer system 100 is referenced as a node.

Figure 2:
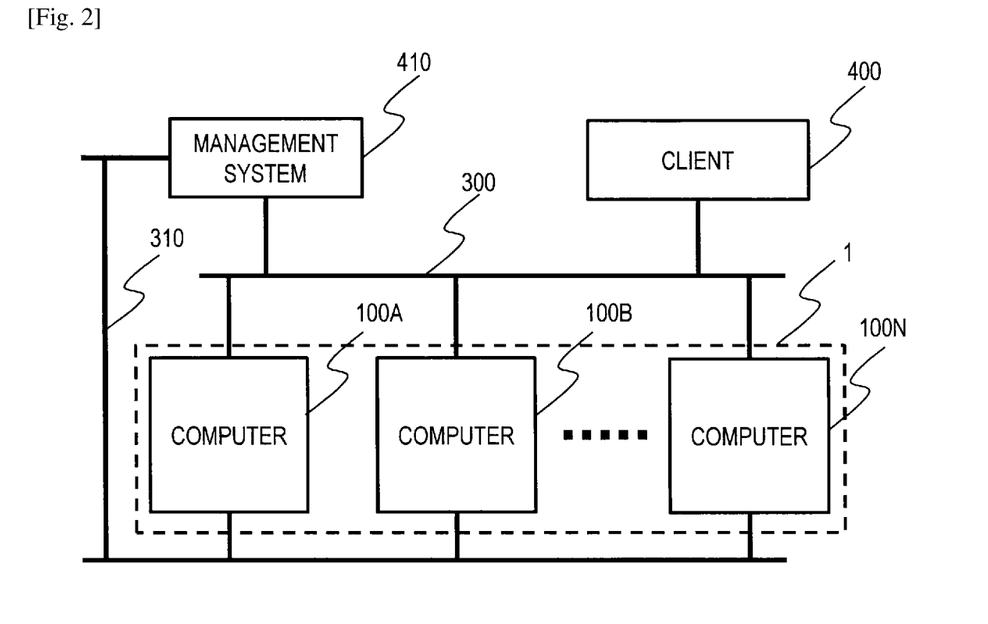
FIG. 2 is a block diagram of an example of information system according to an embodiment.

FIG. 2 is a block diagram of an example of information system according to an embodiment of the present invention. The information system includes a distributed data storage system 1 (hereinafter, referenced as cluster 1), a management system 410, and at least one client 400. The cluster 1 consists of plurality of nodes 100A to 100N. Hereinafter, a node 100 is a generic term of the nodes 100A to 100N. The nodes 100 are connected to each other with a front end communication network 300. In another embodiment, the nodes of the cluster 1 are connected to each other with a secondary back end network (not shown in the diagram). The nodes 100 can communicate with each other using the network 300.

The management system 410 may be a general purpose computer with input and output devices, a memory, a CPU, storage media and so on. The management system 410 may have similar configuration to the computer system 100. The management system 410 is connected with all the nodes 100 of the cluster 1 either via a dedicated management network 310 or via the common front end network.

The management system 410 is configured to manage the configuration and the settings of the cluster 1. The management tasks includes making a new storage volume, grouping together some nodes 100, creating backup of stored data, and so on The client 400 may be a general purpose computer with input and output devices, a memory, a CPU, storage media and so on. The client 400 may have similar configuration to the computer system 100. The client 400 is connected with the cluster 1 via the network 300 and can communicate with any node 100 of the cluster 1.

The client 400 sends data read requests and data write requests (data access requests) to any node 100 of the cluster 1. The cluster 1 accepts the data access request from the client 400. When the cluster 1 receives a data write request from the client 400, it distributes the received data to multiple nodes 100 of the cluster 1 according to predetermined algorithm. When the cluster 1 receives a data read request from the client 400, the cluster 1 gathers the requested data from different nodes 100 and returns the data to the client 400.

Figure 3:
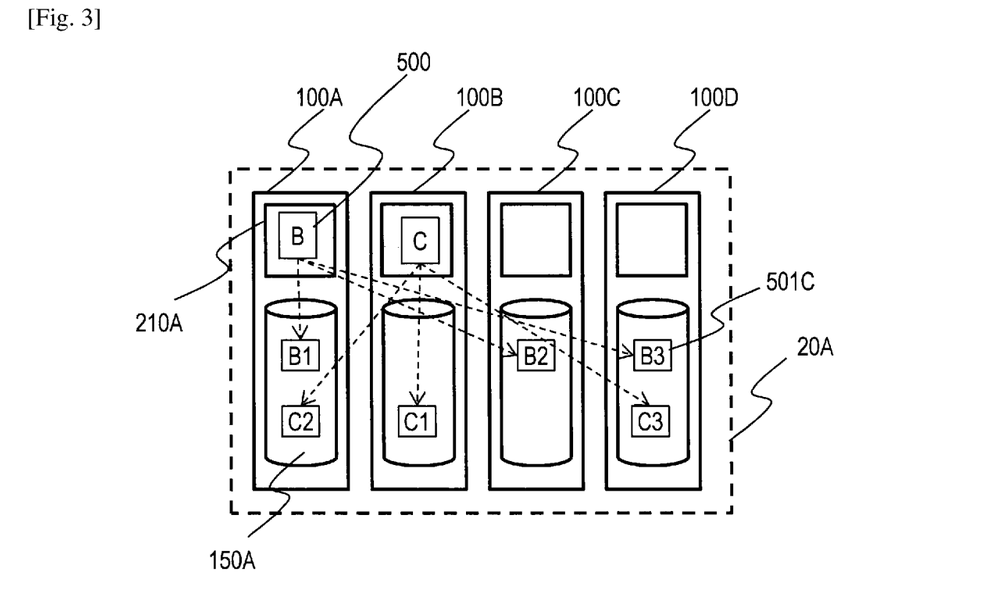
FIG. 3 is a schematic diagram of an example of cluster.

FIG. 3 is a schematic diagram of an example of the cluster 1. In this example, the cluster 1 consists of 4 nodes 100A, 100B, 100C and 100D. The client 400, the management system 410, the network 300 and the network 310 are not shown in the diagram for the sake of simplicity. The nodes 100A to 100D can transmit and receive data to and from every other node 100 in the cluster 1.

The management system 410 has logically grouped together all the nodes 100 of the cluster 1 into a group called 'node group' 20A. The data from client 400 is divided and distributed to different nodes of the cluster 1. Thus, a single node 100 of the cluster 1 may store only a part of the data from the client 400. Each node 100 stores data in an accessible storage device each node manages. The managed storage device includes the storage disk 150, the memory 200, the external storage system 191 and the external storage disk 192, for example.

The client 400 may store data as objects. An object may be a file, a directory of a file system or a volume, for example. The client 400 may transmit data as an object or a part of an object (for example, write block data) to the node 100. Hereinafter, data of a whole or a part of object is referred as object data. Any node 100 of the node group 20A can receive object data from the client 400, and the received object data may be divided and saved in one or more nodes 100 of the node group 20A.

Which part of the received data must be saved to which node 100 may be determined using a well know data distribution algorithm, CRUSH for example. For the ease of data management, object data may be divided and data segments 501 of a predetermined size may be created from the object data. Each segment 501 may include redundant data, or alternatively, one or more data segments 501 of redundant data may be created from the object data.

For example, if the size of the data segment 501 is 1 MB, and the received object is 4 MB, the received object is divided into 4 data segments 501 of 1 MB each and one or more redundant data segments 501 may be created. The data segments 501 are distributed to the nodes 100 of the node group 20A according to the stripe size and data distribution algorithm.

The stripe size is the number of storage areas of a stripe line. The stripe line stores client data and the redundant data (parity data). When a part of the client data in stored in the stripe is lost, it can be restored from the rest client data and the parity data. The stripe size is equal to the number of nodes to store the data segments 501 of the stripe line. The tripe size is equal to or less than the size of the node group 20A. The size of a node group is the number of the nodes of the node group. In the example shown in FIG. 3, the stripe size is 3 while the size of the node group 20A is 4 (4 nodes).

In the example shown in FIG. 3, the client 400 sends a write request and data 500 for an object B, to the node 100A. The node 100A receives the data 500 and first stores the data in its data cache 210A, then the node 100A creates data segments 501 of B1, B2, and B3 from the data 500, and distributes these segments 501 to target nodes 100A, 100C and 100D, respectively.

Each target node 100 stores the data segment in its own storage media 150. For example, the segment B1 is stored in storage media 150A. Similarly, data for an object C is received at node 100B, and the data segments are distributed to the nodes 100A, 100B and 100C.

Multiple node groups 20 can exist in the cluster 1. Each object stored in the cluster 1 can be assigned to one node group only. Data of an object cannot be stored in nodes which do not belong to the node group to which the object has been assigned.

Figure 4:
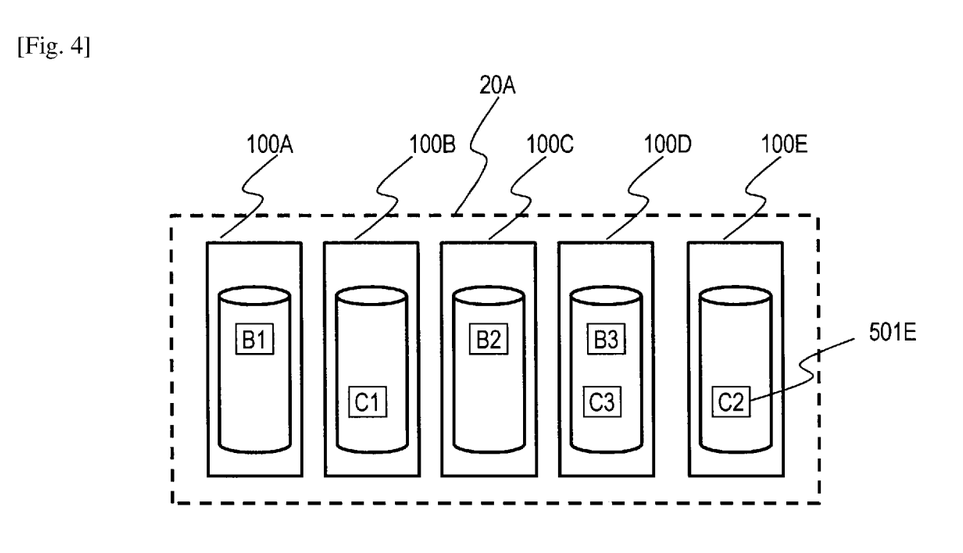
FIG. 4 is a schematic diagram of an example of node group expansion.

FIG. 4 is a schematic diagram of an example of node group expansion. In this example, a new node 100E is added to the node group 20A of 4 nodes as shown in FIG. 3. In this example, the existing node group 20A is expanded from 4 nodes to 5 nodes and includes the new node 100E. When the node group 20A is expanded, the rebalancing program 760 is executed for all the existing stored data in the node group 20A.

The rebalancing program 760 uses a data distribution algorithm such as CRUSH to update the data distribution pattern of all the objects stored in the node group 20A. For example, the new pattern requires some of data segments to be moved from each old node 100 to the new node 20B. For example, the rebalancing program 760 makes the entire data of the node group 20 A becomes almost evenly distributed in all the nodes of the node group 20A.

For example, the rebalancing program 760 may select nodes to store data segments of an object based on the object ID of the object. Specifically, the rebalancing program 760 calculates a hash value of a sum of the object ID of the object and the node ID of each node in the node group. The rebalancing program 760 selects nodes in descending order of the hash value for storing the data segments of the object.

For example, in the example shown in FIG. 4, the data distribution pattern for the object C changed from {2, 1, 4} to {2, 5, 4}. Thus, all the data segments of the object C stored in the first node, i.e. node 100A is moved to the 5th node, i.e. the node 100E. In this example, the data segment C2 is moved from the node 100A and stored in the node 100E.

Figure 5:
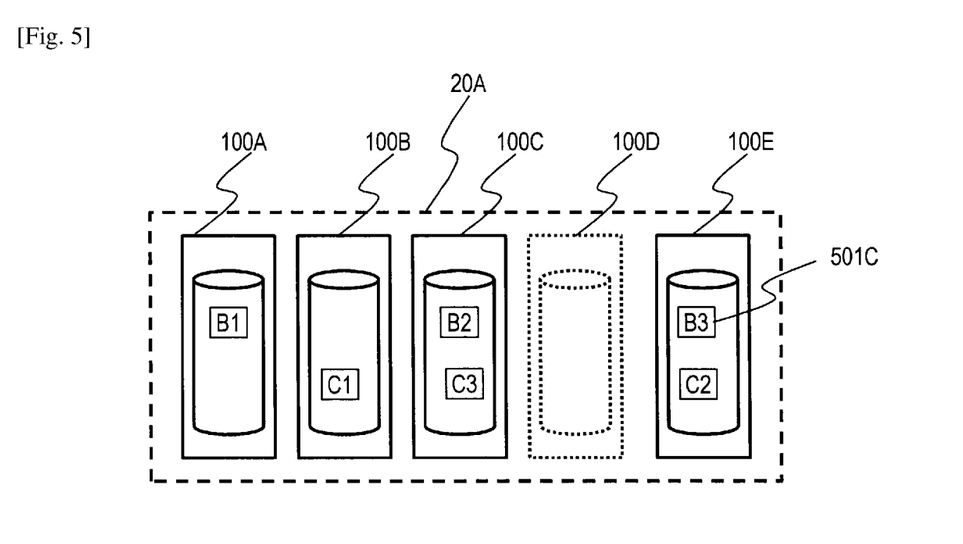
FIG. 5 is a schematic diagram of an example of node group shrink.

FIG. 5 is a schematic diagram of an example of node group shrink. In this example, the node 100D is removed from the node group 20A of 5 nodes explained using FIG. 4. When the node group 20A is shrunk, the rebalancing program 760 is executed for all the existing stored data. The rebalancing program 760 uses the data distribution algorithm to update the data distribution pattern of all the objects stored in the node group 20A. For example, the new pattern is determined not to include the node being removed and evenly distribute all the data segments in the node 100D to the other nodes of the node group 20A.

In the example shown in FIG. 5, the data distribution pattern for the object C changes from 12, 5, 4) to {2, 5, 3}. Thus, all the data segments of the object C stored in the 4th node, i.e. the node 100D is moved to the 3rd node, i.e. the node 100C. In this example, the data segment C3 is moved from the node 100D and stored in the node 100C.

Similarly, the data distribution pattern for the object B changes from {1, 3, 4} to {1, 3, 5}. Thus, all the data segments of the object B stored in the 4th node, i.e. the node 100D is moved to the 5th node, i.e. the node 100E. In this example, the data segment B3 is moved from the node 100D and stored in the node 100D.

Once the rebalancing process is completed and the data has been moved to other nodes, the node 100D becomes empty and can be removed from the node group 20A, and from the cluster as well. After the removal of the node, the node pattern may be corrected. For example, the node numbers for the object B after the removal of the node 100D, e.g. the data distribution pattern for the object B after the removal of the node 100D is corrected from {1, 3, 5} to {1, 3, 4}. The node 100E becomes the 4th node after the removal of the node 100D.

Figure 6:
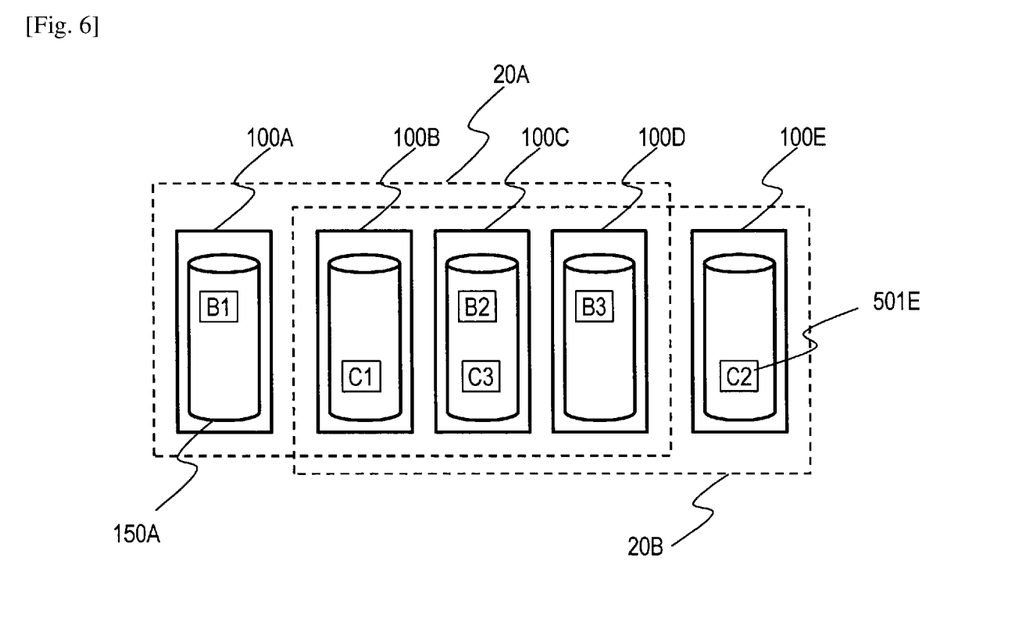
FIG. 6 is a schematic diagram of an example of sliding window node grouping.

FIG. 6 is a schematic diagram of an example of sliding window node grouping. In order to solve the problem of ever expanding node group, this embodiment uses a sliding window method. The sliding window method gradually separates two node groups as more new nodes are added to the cluster 1.

At first, when the number of nodes 100 in the cluster 1 (consisting of the node group 20A) is less than a predetermined optimal node group size, the node group keeps on expanding when more nodes are added to the cluster. Thus, the node group size of the existing node group 20A gets closer to the optimal node group size.

On the other hand, when a new node is added to the cluster 1 where the existing node group size is already the predetermined optimal node group size, a new node group is created which includes the newly added node and the old (existing) nodes except one of the old nodes. This method shares some of the nodes between the two node groups, while some nodes each remain exclusively assigned to one node group.

Thus, this method allows the node group size of each node group to be close to the optimal node group size. In this example, the node group size of the existing node group and the node group size of the new node group are the optimal node group size. The size of the new node group may be different from the optimal size depending of the situation.

In an example shown in FIG. 6, the optimal node group size is set to be 4 nodes. The original cluster of 4 nodes is already explained using FIG. 3. According to an embodiment, when the new node 100E is added to the cluster 1 consisting of the node group 20A of the optimal node group size (4 nodes), the sliding window program 750 creates a new node group 20B which completely overlaps the original node group 20A, i.e. the new node group 20B consists of the same nodes as the original node group 20A, namely, the node groups 20A and 20B each consist of the nodes 100A to 100D.

The rebalancing program 760 reassigns one or more objects (data) stored in the cluster 1 to the new node group 20B. There are various methods to decide which object(s) should be assigned to the new node group 20B. For example, half of all the stored objects may be assigned to the new node group, or based on the amount of data of each object, the objects are assigned to node groups such that each node group holds half the stored data amount after the assignment, etc. As described above, each object is assigned exclusively to one node group. In the example illustrated in FIG. 6, the object C is reassigned from the node group A to the node group 20B, and the object B is kept assigned to the node group 20A.

Once the object reassignment is done, the sliding window process is carried out for the new node group 20B. The sliding window program 750 removes one node from the node group 20B and adds another node (that is not originally assigned to any group) to the group 20B. In the example illustrated in FIG. 6, the node group 20B slides to the right, i.e. the node 100A is removed from the group 20B and the new node 100E is added to the group 20B.

It results in some nodes being shared between the two node groups 20A and 20B, and some nodes each being assigned exclusively to either one of the node groups. In this example, the nodes 100B, 100C, and 100D are common (shared) between the node groups 20A and 20B. The node 100A is assigned only to the node group 20A, and the new node 100E is assigned only to the node group 20B. Thus, in the example illustrated in FIG. 6, the node group 20A consists of 4 nodes namely, 100A, 100B, 100C and 100D, while the node group 20B also consists of 4 nodes namely, 100B, 100C, 100D, and 100E.

When the node 100A is removed from the node group 20B, the rebalancing process is performed similar to as explained in FIG. 5. When the node 100E is added, the rebalancing process is performed similar to as explained in FIG. 4. Both of these rebalancing processes are performed by the rebalancing program 760 for the objects assigned to the node group which is slid. In this example, the rebalancing processes are performed for the object C of the node group 20B. These rebalancing processes can be performed one after the other, or can be performed together.

Before the node group sliding process, the segment C2 is stored in node 100A (see FIG. 3). As the node group 20B is slid to the right and the node 100A is removed from the node group 20B, the data of the objects to be stored in the slid node group 20B stored in the node 100A is moved to nodes of the node group 20B. In this example, the rebalancing program 760 moves the segment C2 from the node 100A to the node 100E.

Figure 7:
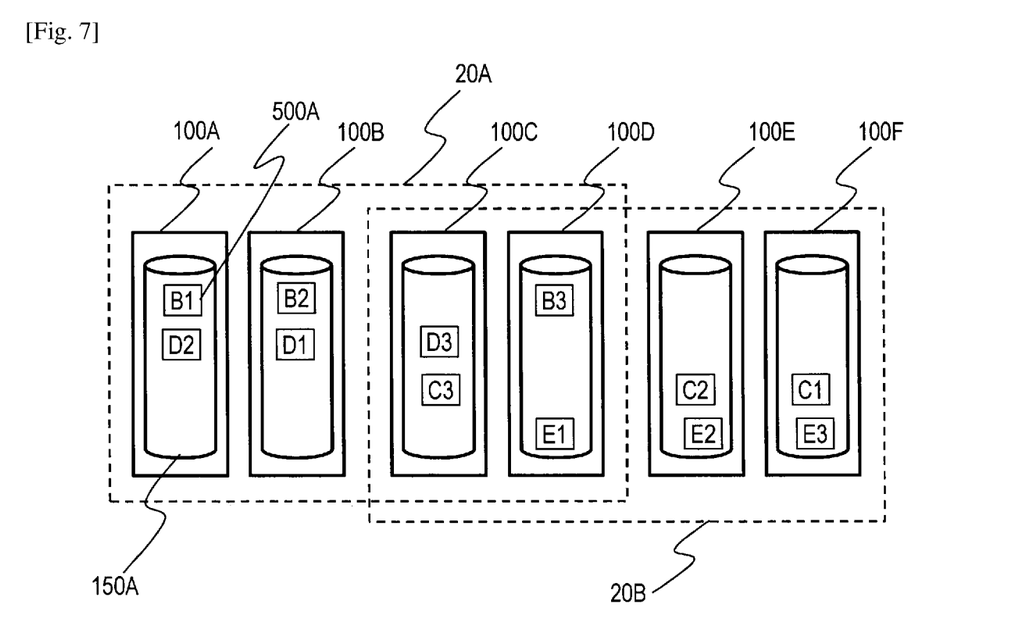
FIG. 7 is a schematic diagram of another example of sliding window node grouping.

FIG. 7 is a schematic diagram of another example of sliding window node grouping. In this example, one new node is added to the cluster 1 which includes at least one pair of partially overlapping node groups. In this example, the two partially overlapping node groups are the node groups 20A and 20B, and a new node 100F is added to the cluster 1.

The configuration of the cluster 1 consisting of 5 nodes before adding the new node 100F is shown in FIG. 6. When the new node 100F is added, the node group sliding process is performed for node group 20B by the sliding window program 750.

In this sliding process, the sliding window program 750 removes one node from one of the node groups and adds another node to the one of the node groups. In this example, the node group 20B slides to the right, i.e. the node 100B is removed, and the new node 100F is added to the node group 20B. Thus, the number of nodes of each of the node groups 100A and 100B is kept at the optimal size.

When the node 100B is removed from the node group 20B, the rebalancing process is performed similar to as explained in FIG. 5. When the node 100F is added, the rebalancing process is performed similar to as explained in FIG. 4. Both of these rebalancing processes are performed by the rebalancing program 760 for the objects assigned to the slid node group. In this example, these rebalancing processes are performed for the objects of the node group 20B, in this example for the object C. These rebalancing processes can be performed one after the other, or can be performed together.

As the node group 20B slides to the right and the node 100B is removed from node group 20B, the data of the objects assigned to the node group 20B stored in the node 100B is moved to other nodes of the node group 20B. In this example, the rebalancing program 760 moves the segment C1 from the node 100B to the node 100F.

It is not necessary that the rebalancing program 760 moves data segments only to the node newly added to the node group. The rebalancing program 760 may decide destination nodes of moved data independently of the order of addition of nodes in order to achieve almost even distribution of total data in the cluster 1.

In the case where the data distribution algorithm used by the rebalancing program 760 tries to evenly distribute data within each of the two node groups, there is a possibility that a shared node stores more amount of data compared to a non-shared node because each shared node stores part of data from each node group.

Thus, in an embodiment, the rebalancing program 760 determines how to distribute data in one of node groups which partially overlap each other based on the data distribution in the other node group so that data is distributed evenly to all the nodes in the node groups. The rebalancing program 760 distributes data in the node groups so that the shared nodes do not end up with more data than the non-shared nodes.

For example, this data distribution can be achieved using a weighted data distribution algorithm. The weighted data distribution algorithm uses a theoretical weight parameter for each node and the data is distributed to the nodes in the ratio of their weight parameters. The amount of data for a node to store is determined based on the weight of the node. For example, the larger weight a node has, the more data the node stores.

The weighted data distribution algorithm determines nodes to store data segments based on the numbers of groups which the nodes belong to. The weigh value of a shared node is smaller than the weight value of a non-shared node. Reducing the weight of each shared node compared to the weight of each non-shared node results in less data being distributed to each shared node within a node group.

Data distribution within a node group may become uneven; however, since a shared node stores data of two node groups, this method helps to achieve even data distribution in a cluster. i.e. each node may end up with almost the same amount of data if an appropriate weight is assigned to each node.

For example, the ratio between the number of data segments allocated to non-shared nodes in a node group, which are not shared between node groups, and the number of data segments allocated to shared nodes in the node group, which are shared between node groups, is determined according to the following formula.

$$Wns*Nns:Ws*Ns$$

Wns, Nns, Ws and Ns represents the weight of non-shared nodes in a node group, the number of the non-shared nodes in the node group, the weight of shared nodes in the node group, and the number of the shared nodes in the node group, respectively.

For example, the weight value of each non-shared node is 0.5 and the weight value of each shared node is 1.0. The number of the non-shred nodes and the number of the shared nodes in a node group can be determined with reference to columns 221, 222 and 223 of the node group management table 220. The node group management table 220 will be described later with reference to FIG. 9.

The data write program 700 determines the number of data segments to be stored in non-shared nodes and the number of data segments to be stored in shared nodes in accordance with the formula. The data write program 700 selects nodes to store data segments from the shared nodes and the non-shared nodes in accordance with the predetermined distribution algorithm.

When a new object is written to the cluster 1, its data segments are distributed to nodes of either of the two node groups. In the example illustrated in FIG. 7, an object D is assigned to the node group 20A and an object E is assigned to the node group 20B. Segments of the object D are written to nodes of the node group 20A only, namely to the nodes 100A, 100B and 100C. Similarly, segments of the object E are written to nodes of the node group 20B only, namely the nodes 100D, 100E and 100F.

This example also shows the weighted distribution process. Each of the shared nodes 100C and 100D has half the weight of each non-shared node. Each non-shared node (100A, 100B) in the node group 20A stores 2 data segments for the objects B and D assigned to the node group 20A, while each shared node (100C, 100D) stores 1 data segment for the objects B and D assigned to the node group 20A.

Similarly, each non-shared node (100E, 100F) in the node group 20B stores 2 data segments for the objects C and E assigned to the node group 20B, while each shared node (100C, 100D) stores 1 data segment for the objects C and E assigned to the node group 20B. This allows entire data in the cluster 1 to be evenly distributed (2 segments in each node).

Figure 8:
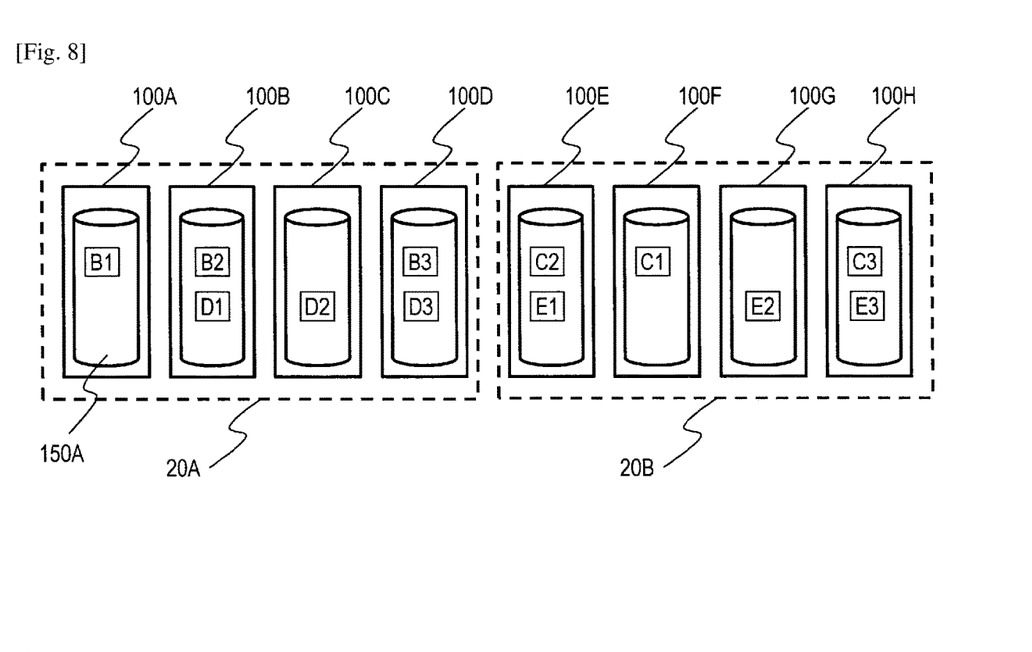
FIG. 8 is a schematic diagram of an example of a cluster, when partially overlapping node groups become completely separate.

FIG. 8 is a schematic diagram of the cluster 1 where the partially overlapping node groups 20A and 20B become completely separate. As explained with reference to FIG. 7, when a new node is added, the node group 20B slides to the right, and the data rebalance process is performed. After adding two more nodes namely 100G and 100H to the cluster 1 shown in FIG. 7, the cluster 1 now consists of 8 nodes. After sliding 2 more nodes to the right, the node group 20B becomes completely separate from the node group 20A.

When a further new node is added, depending on the cluster node grouping policy, either the new node gets added to one of the node groups (node group expansion) or a new node group 20C is formed. The node group C partially overlaps either one of the existing node groups 20A or 20B. The node group 20C is slid with further new nodes added and become more separate.

Figure 9:
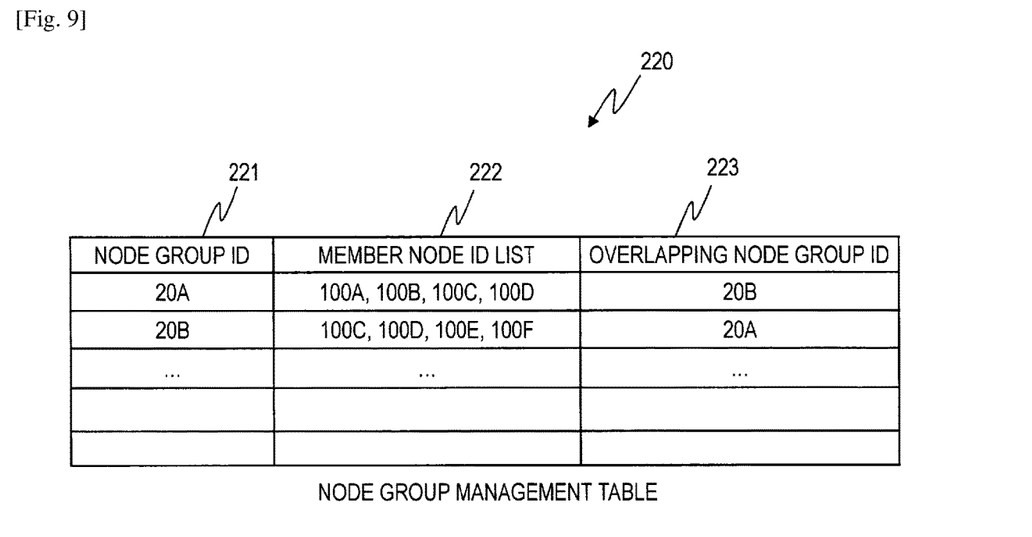
FIG. 9 depicts an example of node group management table.

FIG. 9 depicts an example of the node group management table 220. The update information in the node group management table 220 is shared by the nodes in the cluster 1 via the network 300 or 301, and each node of the cluster 1 has the node group management table 220 containing of the same information. The node group management table 220 stores the node group configuration information for a cluster.

For example, following items are stored in the node group management table 220. The IDs of all the node groups in the cluster 1 are stored in the column 221. A list of the IDs of the member nodes of each node group is stored in the column 222. The ID of corresponding overlapping node group with each node group is stored in the column 223.

Figure 10:
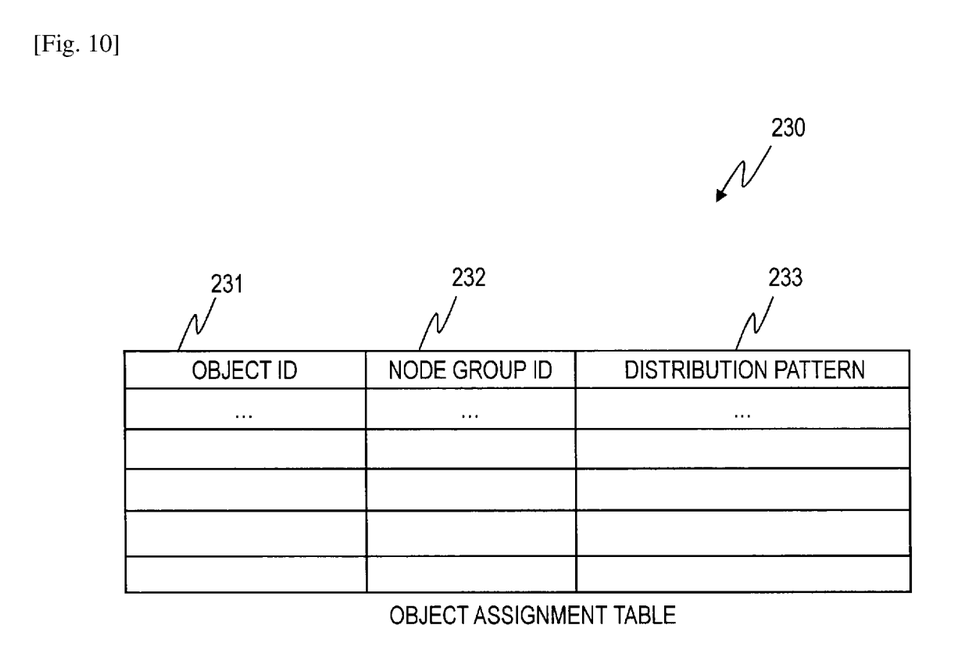
FIG. 10 depicts an example of object assignment table.

FIG. 10 depicts an example of the object assignment table 230. The update information in the object assignment table 230 is shared by the nodes in the cluster 1 via the network 300 or 301, and each node of the cluster 1 has the object assignment table 230 containing of the same information.

The object assignment table 230 stores information about which node group and optionally which node numbers (distribution pattern) of the node group an object has been assigned to. The object assignment table 230 indicates a node group and nodes to which each object is assigned.

A column 231 stores the ID of each object stored in the cluster 1. A column 232 stores the ID of a node group to which the relevant object of the column 231 is assigned. A column 233 stores the distribution pattern (nodes) for each relevant object in the column 231. In the case where the data distribution can be calculated using some data distribution algorithm such as CRUSH, this column is not required. In another embodiment, the column 231 may store ranges of contiguous Object IDs assigned to a node group.

Figure 11A:
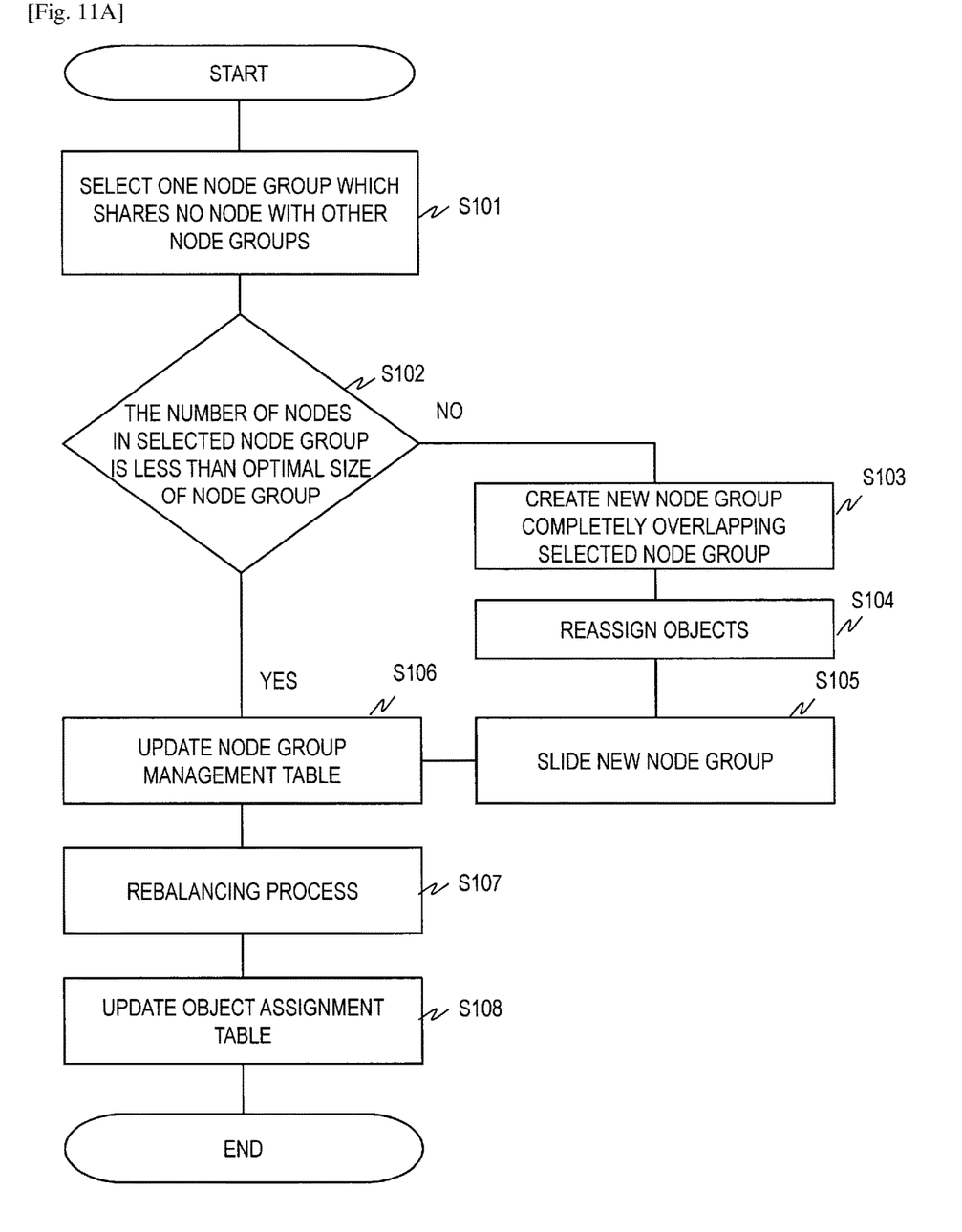
FIG. 11A depicts an example of a flowchart for adding a new node to a node group which shares no node with other node group.

FIG. 11A depicts an example of a flowchart for adding a new node to a node group which shares no node with other node groups, i.e. which does not overlap other node groups. For example, the management system 410 may notify a node 100 in the cluster 1 of the addition of the new node. The process explained with reference to FIG. 11A or FIG. 11B may be performed by the management system 410. The same applies to the explanation of FIG. 11B.

First, the sliding window program 750 of the notified node 100 selects a node group overlapping no other node groups for adding a new node (S101). The sliding window program 750 checks the number of the nodes constituting the selected node group with reference to the column 222 in the node group management table 220.

When the number of the nodes of the node group is less than the predetermined optimal size (S102: YES), the sliding window program 750 updates the record of the node group in the node group management table 220 to add the new node to the cell of the column 222 of the record of the node group (S106).

When the number of the nodes of the node group is equal to or over the predetermined optimal size (S102: NO), the sliding window program 750 creates a new node group completely overlapping the selected node group (S103). Next, the sliding window program 750 calls the rebalancing program 760 to reassign objects to the new node group as described with reference to FIG. 6 (S104). Next, the sliding window program 750 slides the new node group to remove an existing node from the new node group and add the new node to the new node group (S106).

Next, the sliding window program 750 creates a new record for the new node group in the node group management table 220. In addition, the sliding window program 750 adds the new node group to the cell of the column 223 in the record of the selected node group (S106).

Next, the sliding window program 750 calls the rebalancing program 760. The rebalancing program 760 performs the rebalancing process for each of the selected node group and the new node group (S107). The rebalancing process is performed as described with reference to FIG. 6. The rebalancing program 760 updates the object assignment table 230 to include the result of the object reassignment and rebalancing (S108).

Figure 11B:
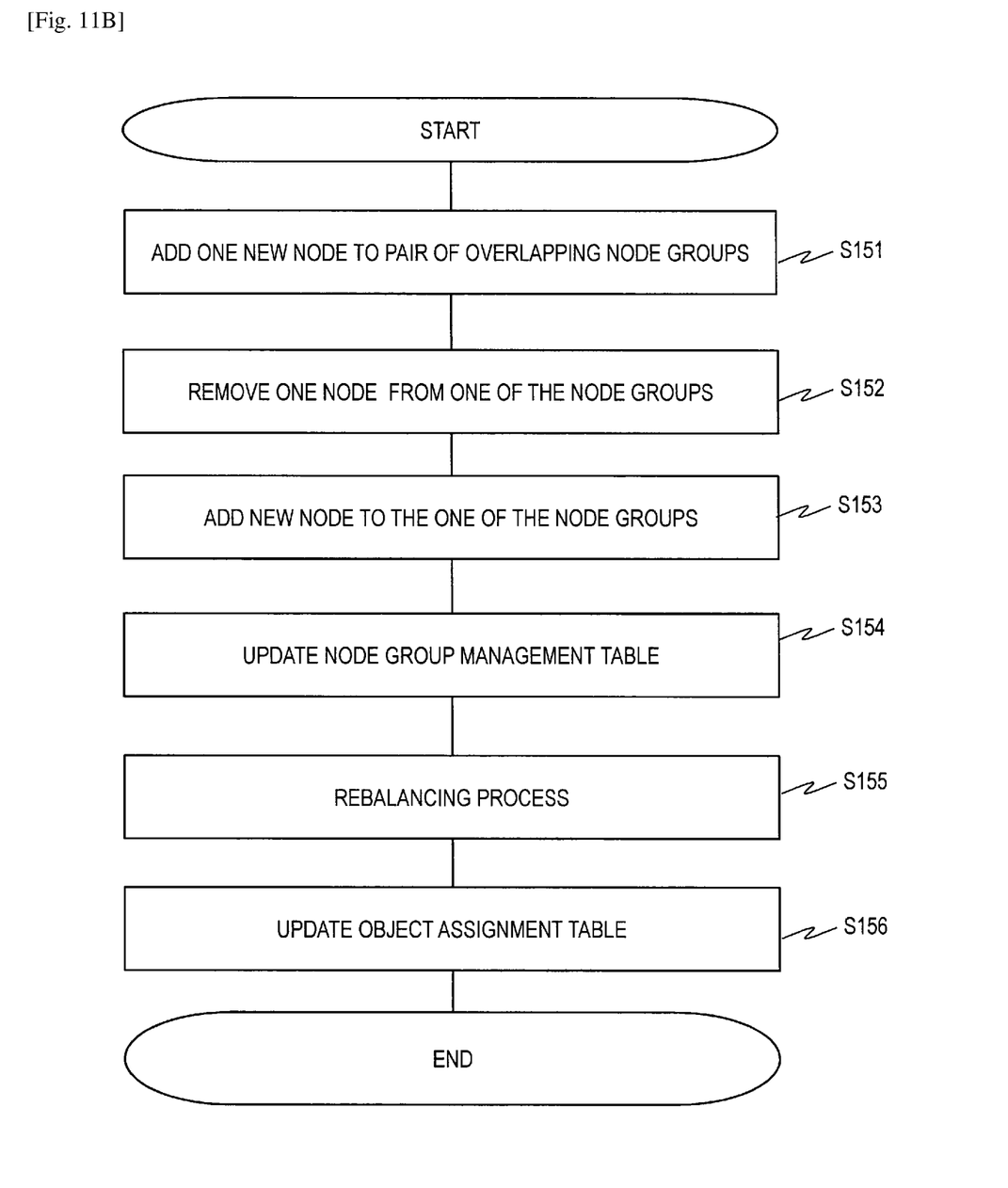
FIG. 11B depicts an example of a flowchart for adding a new node to a pair of node groups which share a part of nodes.

FIG. 11B depicts an example of a flowchart for adding a new node to a pair of node groups which share a part of nodes. The sliding window program 750 adds a new node to a pair of node groups with overlapping nodes (S151). The sliding window program 750 selects one node group from the pair and slides the selected node group. Specifically, the sliding window program 750 removes one existing node from the selected node group (S152) and adds the new node to the selected node group (S153).

When the two node groups have no shared nodes after step S153, the two node groups are completely separate. The sliding window program 750 updates the cell of the column 221 of the record of the selected node group in the node group management table 220.

Next, the sliding window program 750 calls the rebalancing program 760. The rebalancing program 760 performs the rebalancing process for the node groups (S155). The rebalancing process is performed as described with reference to FIG. 7. The rebalancing program 760 updates the object assignment table 230 to include the result of the rebalancing (S156).

Figure 12:
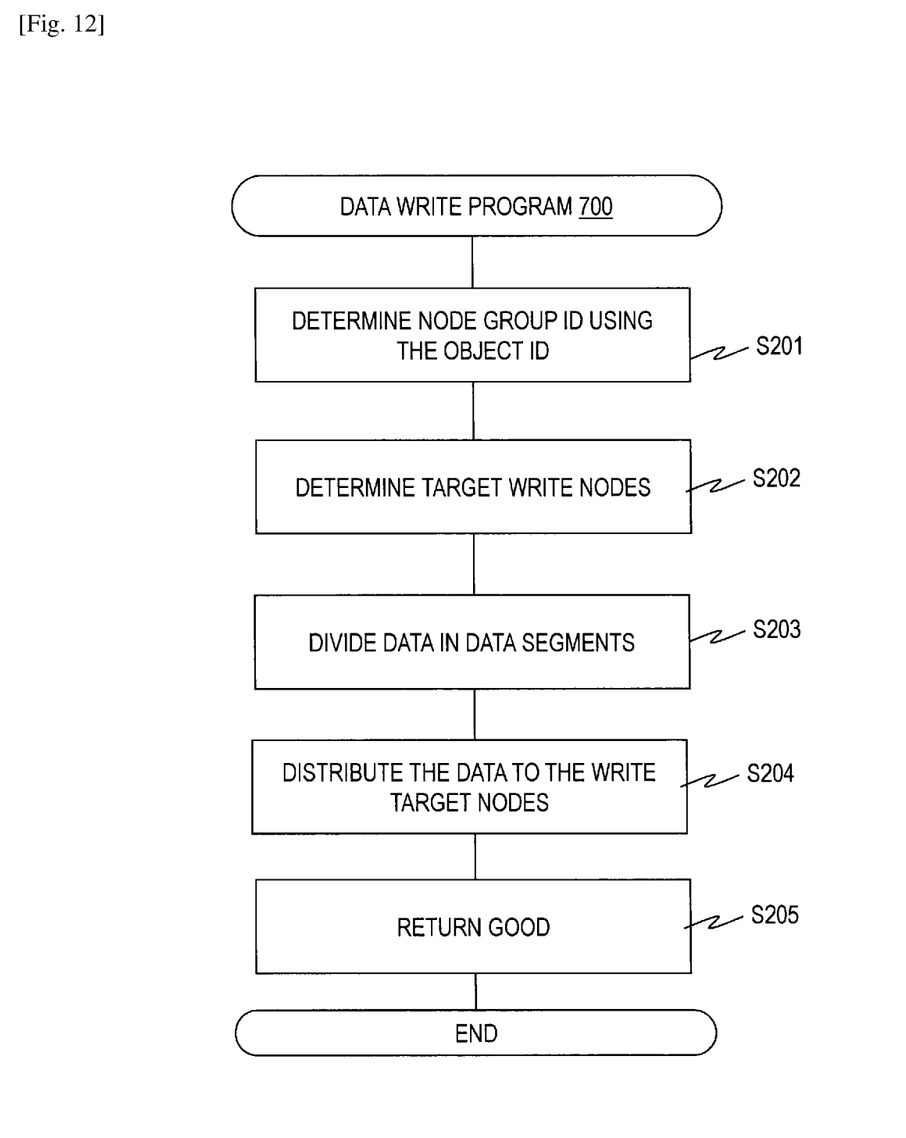
FIG. 12 depicts an example flow chart diagram for the data write program.

FIG. 12 depicts an example of a flowchart for the data write program 700. When the node 100A of the cluster 1 receives a data write request from the client 400 for an object, the data write program 700 distributes and writes the received object data to multiple nodes 100 of the node group 20 to which the object belongs.

In step S201, the write program 700 refers to the object assignment table 230 to determine the ID of the node group 20 and the data distribution pattern for the given object ID. In the case where the object assignment table 230 is not available, the write program 700 may use a data distribution algorithm (CRUSH, for example) to determine the data distribution pattern of the given object ID. The object ID is provided by the client 400 along with the write request.

In step S202, the write program 700 refers to the node group management table 220 and the information retrieved in step S201 to determine the node IDs of the nodes to which the object data should be distributed.

In step S203, if the size of the received data is more than the predetermined data segment size, the program 700 divides the received object data into multiple data segments. If the size of the received data is equal to or less than the predetermined data segment size, data division is not performed.

In step S204, the write program 700 sends write requests for data segments to respective nodes as determined in step S202 using network 300. Each node 100 which receives the data segment(s) writes it to its own cache 210 and returns an acknowledgement to the node 100A which sent the write requests.

Once the acknowledgements from all the target nodes are received, in step S205, the write program 700 at the node 100A returns an acknowledgement to the client 400 which sent the write request to the node 100A. In another embodiment, each node which receives the data segments from the node 100A mirrors the data to a predetermined pair node 100. This helps to curb data loss in the case where data segments written to cache 210 suffer from power loss or fault in the memory 200, before destaging the data to the storage media 150.

In another embodiment, the data destaging process may implement data redundancy methods like mirroring or RAID between the nodes, so that when a node fails for some reason, data of the failed node can be recovered using the redundancy data.

Figure 13:
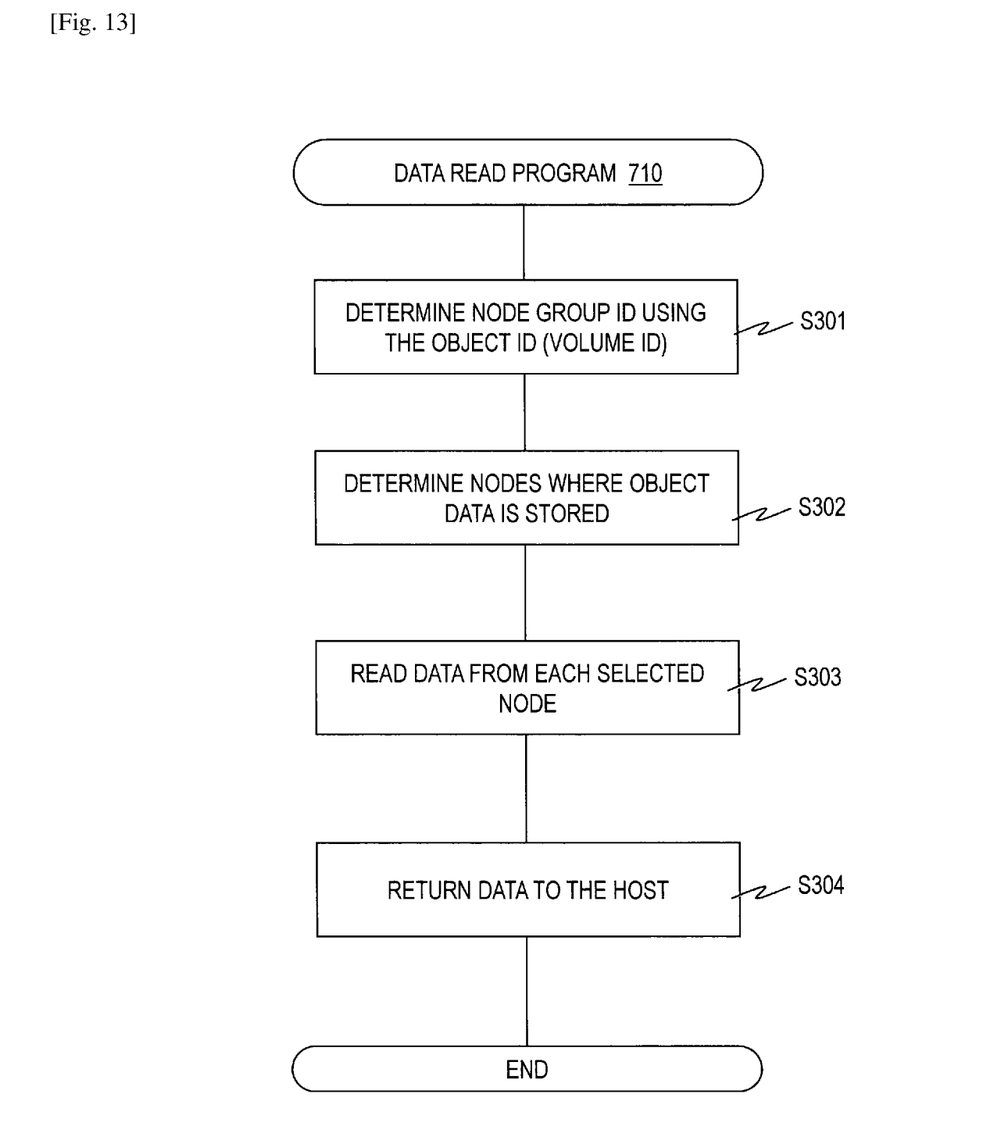
FIG. 13 depicts an example flow chart diagram for the data read program.

FIG. 13 depicts an example of a flowchart diagram for the data read program 710. When the node 100A receives a data read request from the client 400 for an object, the data read program 710 determines which nodes actually hold the requested data, and it reads data from the nodes, collects together the data received from the nodes and returns it to the client 400.

In step S301, the data read program 710 refers to the object assignment table 230 to determine the ID of the node group 20 and the data distribution pattern for the given object ID. In the case where the object assignment table 230 is not available, the data read program 710 may use a data distribution algorithm (CRUSH, for example) to determine the data distribution pattern of the given object ID. The object ID is provided by the client 400 along with the data read request.

In step S302, the program uses the node group management table 220 and along with the information retrieved in step S301 to determine the node IDs of the nodes to which the object data is distributed.

In step S303, the data read program 710 sends read requests to the relevant nodes determined in step S302 where required data is stored. The target nodes receive the read request and read the data from their caches 210. If the requested data is not available in the cache 210, the data read program 710 read data from their storage media 150 and return the data to the node 100A. The node 100A collects data returned from the relevant nodes, organizes this data in correct order and returns this data to the client 400 in step S304.

The present invention can also be realized by a program code of software for realizing the functions of the embodiments. In this case, a storage medium having recorded therein the program code is provided to a system or an apparatus and a computer (or a CPU or an MPU) of the system or the apparatus reads out the program code stored in the storage medium. In this case, the program codes read out from the storage medium realize the functions of the embodiments explained above. The program codes and the storage medium having the program codes stored therein may configure the present invention. As the storage medium for supplying such program codes, for example, a flexible disk, a CD-ROM, a DVD-ROM, a hard disk, an optical disk, a magneto-optical disk, a CD-R, a magnetic tape, a non-volatile memory card, or a ROM is used.

Moreover, it is also possible that the program code of the software for realizing the functions of the embodiments is delivered via a network, whereby the program code is stored in storing means such as a hard disk or a memory of a system or an apparatus or a storage medium such as a CD-RW or a CD-R and, when the program code is used, a computer (or a CPU or an MPU) of the system or the apparatus reads out and executes the program code stored in the storing means or the storage medium.

Lastly, it is necessary to understand that the process and the technique explained above are not essentially related to any specific apparatus and can be implemented by any appropriate combination of components. Further, it is possible to use general-purpose devices of various types according to the teaching explained above. It may be seen that it is useful to build a dedicated apparatus to execute the steps of the method explained above. Various inventions can be formed by an appropriate combination of the plural components disclosed in the embodiments. For example, several components may be deleted from all the components explained in the embodiments. Further, the components explained in the different embodiments may be combined as appropriate. The present invention is described in relation to the specific examples. However, the specific examples are for explanation and are not for limitation in every aspect. It would be understood by those skilled in the art that there are a large number of combinations of hardware, software, and firmware suitable for carrying out the present invention. For example, the software explained above can be implemented in a program or a script language in a wide range such as assembler, C/C++, perl, Shell, PHP, etc.

Further, in the embodiments, control lines and information lines considered necessary in explanation are shown. Not all control lines and information lines are shown in terms of a product. All components may be coupled to one another.

In addition, other implementations of the present invention would be made apparent for those having ordinary knowledge in the technical field from the ex-amination of the specification and the embodiments of the present invention disclosed herein. The various forms and/or components of the explained embodiments can be used independently or in any combination in a computerized storage system having a function of managing data. The specification and the specific examples are merely typical ones. The scope and the spirit of the present invention are indicated by the following claims.

The invention claimed is:

1. A distributed storage system comprising:
a first node group consisting of a plurality of first nodes that store first data;
a second node group consisting of a plurality of second nodes that store second data;
a computer coupled to each of the first nodes and each of the second nodes,
wherein the computer divides data of an object assigned to the first node group into data segments and distributes and stores the data segments of the object assigned to the first node group only to the first nodes,
wherein the computer divides data of an object assigned to the second node group into data segments and distributes and stores the data segments of the object assigned to the second group only to the second nodes,
wherein the first node group includes at least one first node shared with the second node group and at least one second node not shared with the second node group,
wherein the second node group includes the at least one first node and at least one third node not shared with the first node group,
wherein upon adding a new first node to the first node group, the computer redistributes all of the first data to the first node group only to the first nodes, which include the new first node.

2. The distributed storage system according to claim 1, wherein a number of nodes constituting the first node group is a predetermined number and a number of nodes constituting the second node group is the predetermined number.

3. The distributed storage system according to claim 1, wherein, in response to the addition of the new first node to the first node group and an addition of a new second node to the second node group, the computer updates a configuration of the second node group to include the new second node and exclude a node from the at least one first node.

4. The distributed storage system according to claim 3, wherein the computer maintains a number of nodes constituting the first node group at a predetermined number and maintains a number of nodes constituting the second node group at the predetermined number.

5. The distributed storage system according to claim 1, wherein, when the new first node is added to the first node group consisting of a predetermined number of nodes, the second node group is created from a part of the predetermined number of nodes of the first node group and the new node.

6. The distributed storage system according to claim 1, wherein the first node group stores less data of objects assigned to the first node group in each of the at least one first node than each of the at least one second node, and wherein the second node group stores less data of objects assigned to the second node group in each of the at least one first node than each of the at least one third node.

7. The distributed storage system according to claim 6, wherein a weight value is assigned to each node of the first node group and the second node group, and wherein data amount to be stored in each node is determined based on the weight value in each of the first node group and the second node group.

8. The distributed storage system according to claim 7, wherein a weight value assigned to the at least one first node is half of a weight value assigned to the at least one second node, and the weight value assigned to the at least one second node is equal to a weight value assigned to the at least one third node.

9. A method of controlling a distributed storage system, including a computer connected to each of first nodes of a first node group that store first data and connected to each of second nodes of a second node group that store second data, comprising:
dividing data of an object assigned to the first node group into data segments;
dividing data of an object assigned to the second node group into data segments;
distributing and storing the data segments of the object assigned to the first node group only to the first nodes of the first node group, the first node group consisting of at least one first node shared with a second node group and at least one second node not shared with the second node group;
distributing and storing the data segments of the object assigned to the second node group only to the second nodes of the second node group, the second node group consisting of the at least one first node and at least one third node not shared with the second node group; and
upon adding a new first node to the first node group, redistributing, by the computer, all of the first data to the first node group only to the first nodes, which include the new first node.

10. The method according to claim 9, wherein, a number of nodes constituting the first node group is a predetermined number and a number of nodes constituting the second node group is the predetermined number.

11. The method according to claim 9, further comprising:
in response to the addition of the first new node to the first node group and an addition of a second new node the second node group, updating a configuration of the second node group to include the new second node and exclude a node from the at least one first node.

12. The method according to claim 11, further comprising:
maintaining a number of nodes constituting each of the first node group and the second node group at a predetermined number.

13. The method according to claim 9, further comprising:
when the new first node is added to the first node group consisting of a predetermined number of nodes, creating the second node group from a part of the predetermined number of nodes of the first node group and the new node.

14. The method according to claim 9, further comprising:
storing less data of objects assigned to the first node group in each of the at least one first node than each of the at least one second node, and
storing less data of objects assigned to the second node group in each of the at least one first node than each of the at least one third node.

15. The method according to claim 14, further comprising:
assigning a weight value to each node of the first node group and the second node group; and
determining data amount to be stored in each node based on the weight value in each of the first node group and the second node group.

* * * * *